UNITED STATES PATENT OFFICE.

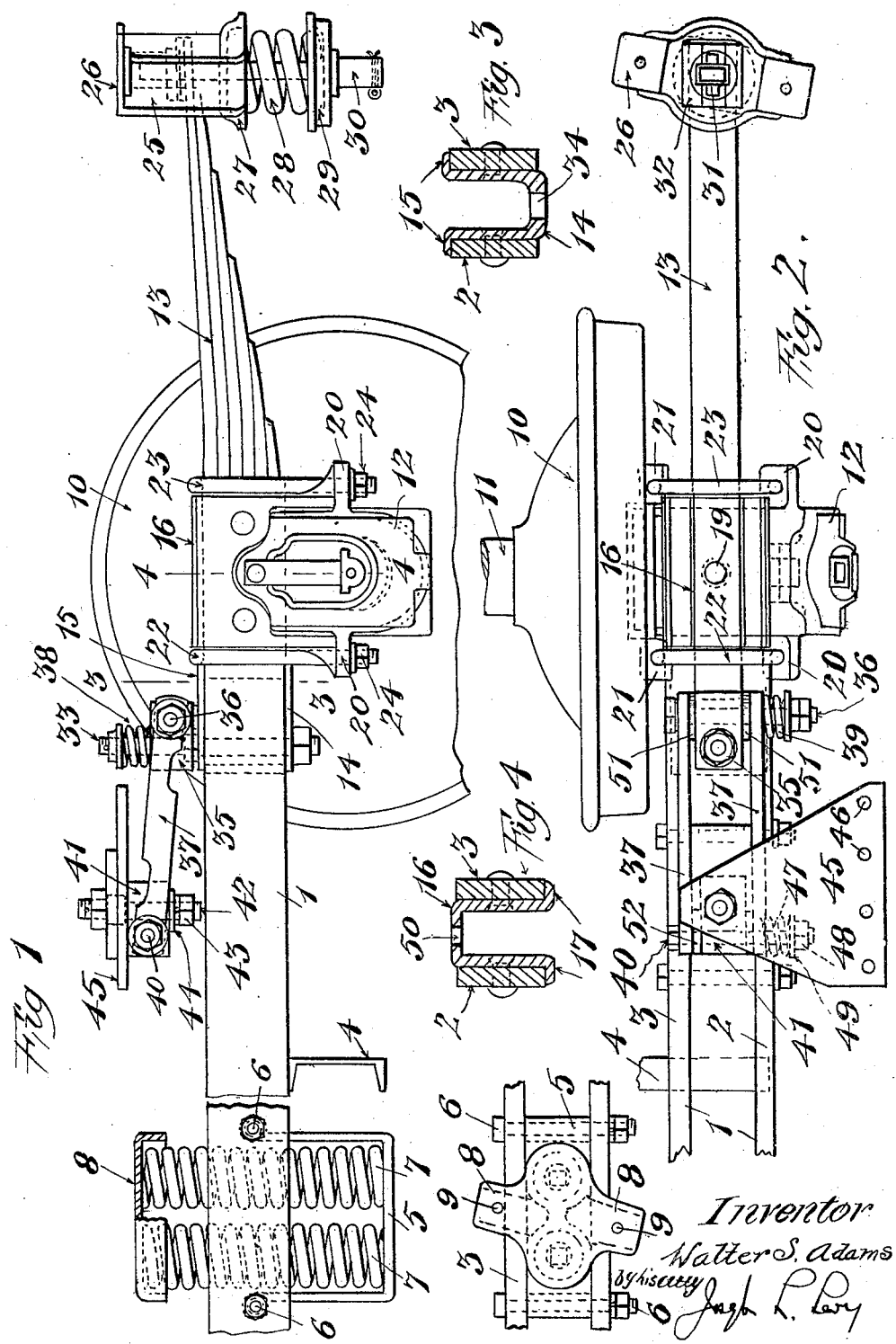

WALTER S. ADAMS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

CAR-TRUCK.

1,325,225.  Specification of Letters Patent.  Patented Dec. 16, 1919.

Application filed March 29, 1919. Serial No. 286,071.

*To all whom it may concern:*

Be it known that I, WALTER S. ADAMS, a citizen of the United States, and a resident of the city of Philadelphia, county of Philadelphia, and State of Pennsylvania, have invented a certain new and useful Improvement in Car-Trucks, of which the following is a specification.

The object of this invention is to provide a suitable car truck which will be light, durable, and easy riding, and in every way suitable for light cars.

A further object of this invention is to provide a truck of this character, whereby it is possible to remove the wheels and axles from the truck readily and expeditiously, without disturbing the remainder of the truck, which remains attached to the car body.

With these objects, and other objects which may hereinafter appear, in view, I have devised the particular arrangement of parts hereinafter set forth, and more particularly pointed out in the claims appended hereto.

Reference is to be had to the accompanying drawings, forming part hereof, in which—

Figure 1 is a side elevation of one end of my improved truck;

Fig. 2 is a plan view of the same;

Fig. 3 is a sectional view on the line 3—3 of Fig. 1; and

Fig. 4 is a sectional view on the line 4—4 of Fig. 1.

Throughout the various views of the drawings, similar reference characters designate similar parts.

In the preferred embodiment of my invention, as disclosed in the accompanying drawing, 1 indicates one of the truck side frames, which consists of two parallel members 2 and 3, suitably bolted or welded together. The side frame is connected to the opposite side frame by crossing 4 of any desired kind.

A central support for the car body consists of a spring seat 5, which depends from the side frame, and is supported upon two bolts 6, which pass between and connect the two members 2 and 3 of each side frame.

Coil springs 7 rest upon the seat 5, and these coil springs carry a seat 8 which is attached by bolts passing through holes 9, to the car body.

The truck is provided with wheels 10, axles 11, and axle boxes 12. The side bars 2 and 3 of the truck frame rest on top of the axle boxes, and between the side bars are mounted quarter elliptic springs 13, which project out from the ends of the truck. These springs are retained in proper position between the side bars 2 and 3 by means of a U-shaped member 14, which embraces the spring, and has its upper ends provided with lips or flanges 15, which extend over the upper edges of the side bars 2 and 3, and tend to support the same. This U member 14 is riveted or welded to the side bars 2 and 3. This construction is shown in Fig. 3.

The U member 14 is aided in holding the spring 13 in position by an inverted U member 16, which is placed reversely to the member 14, that is, with its open end downward, and it is provided with lips of flanges 17, which extend under the lower edges of the side bars 2 and 3. This inverted U member 16 is riveted or welded to the side bars. It will thus be seen that by means of these oppositely disposed U members 14 and 16, a suitable clamp for properly holding the spring 13 in position between the side bars 2 and 3 of the frame is provided.

The axle boxes 12 are each provided with a projecting boss 19 on top, and this fits an opening 34, provided in the bottom of the U member 14. By this arrangement, the wheel base of the truck is positively maintained at all times. To hold the axle boxes in position, I provide a pair of U bolts 22 and 23. The U bolt 22 straddles the side bars 2 and 3 of the frame, while the U bolt 23 straddles the spring 13, and both of these bolts pass through ears 20 and 21 on the axle box. Nuts 24 on these U bolts hold the axle box in position. By the arrangement above described, it will be seen that the wheels, axle boxes and axles can be readily removed from the truck at any desired time by merely removing the U bolt nuts 24 and raising the car and truck, leaving the wheels, axle boxes and axle free from the truck, with all the other truck parts remaining undisturbed and attached to the car body.

The outer end of each leaf spring is mounted in a bracket 25, which is provided on its upper ends with flat surfaces 26, which affords a means for attaching this bracket 25 to the car body. The lower end of the bracket 25 is provided with a spring seat 27, which rests upon a coil spring 28, supported on a seat 29. This seat 29 is carried by a hanger 30, which is carried by the end of the leaf spring 13. The upper end of this hanger 30 passes through an opening in the leaf spring, and is carried upon a pin 31 resting in a bearing 32.

To prevent the truck from getting out of alinement without materially increasing the weight of the car, and truck to an appreciable extent, and to utilize the rigidity of the frame of the car, whereby all diagonal bracing of the truck may be eliminated, I provide suitable links which connect the car body and truck frame, one on each side of the truck at diagonally disposed corners. On a vertically projecting bolt 33, which passes through the spring 13, and through an opening 50 with which the inverted U member 16 is provided, is mounted a block 35, and extending at right angles through the block 35 is a bolt 36. This bolt 36 extends through a pair of parallel links 37, one of which is placed on each side of the block 35, with a non-metallic washer 51 interposed between the sides of the block and the links. The block 35 is free to turn on the bolt 33, but is prevented from turning too freely by means of a coil spring 38. Surrounding the bolt 36 is another coil spring 39, which is a substantially weak spring, its main function being to keep the parts from rattling. The other ends of the links 37 are connected to a bolt 40, which passes through a second block 41, mounted on a depending bolt 42, which carries a nut 43 and a washer 44. Interposed between the sides of the link 37 and the block 41 are non-metallic washers 52, similar to the washers 51, the purpose of the washers 51 and 52 being to avoid metallic contact between the parts and deaden all sound or noise apt to arise during the operation of the device. The bolt 42 extends from a plate 45, which is provided with holes 46, through which suitable bolts may be passed for attachment to the car body.

The bolt 40 is in all respects similar to the bolt 36, and is provided with a spring 47, nuts 48, and washer 49, for holding said spring in position.

Thus it will be seen that the links 37, blocks 41, and 35, and spring 38, prevent excessive side swing because of the friction between the parts due to these springs, and at the same time sufficient play is provided to permit the car body to ride easily on the truck at all times, and especially on curves.

The brake rigging and motor supports may be carried in any suitable way, and made in any suitable form, but are preferably made and carried so that space is left for storage batteries or other devices as desired.

The rigidity of the frame of the car body coöperates through the links 37 and the connected parts so as to make the frames 1 of the truck remain secure and in alinement at all times. It will also be seen that by the construction shown and described, a ready removal of the axle boxes, wheels and axle is permitted.

From the foregoing, it is obvious that my invention is not to be restricted to the exact embodiment shown, but is broad enough to cover all structures coming within the scope of the annexed claims.

Having described my invention, what I claim is:

1. In a car truck, a side frame, comprising a pair of spaced apart members, a leaf spring placed between said members, and oppositely disposed U members embracing said spring.

2. In a car truck, a side frame, comprising a pair of spaced apart frame members, a quarter elliptic spring placed between said members, a U member secured between said members upon which said spring is adapted to rest, and an inverted U member secured between said frame, and adapted to embrace one end of the spring.

3. In a car truck, a side frame, comprising a pair of spaced apart members, a leaf spring placed between said members, oppositely disposed U members placed between the frame members, and adapted to embrace the spring, an axle box, and means for supporting the same comprising a pair of U bolts secured to said axle box and adapted to straddle the frame and spring.

4. In a car truck, a side frame comprising a pair of spaced apart frame members, a leaf spring secured between the same, an axle box and axle box supporting means comprising a pair of U bolts adapted to straddle the frame and spring.

5. In a car truck, a side frame, a spring secured to said frame, an axle box, and U bolts secured to said axle box, and straddling said frame and spring.

6. In a car truck, a side frame comprising a pair of spaced apart members, a leaf spring lying between said members, oppositely disposed U members adapted to embrace said spring between them, an axle box, ears on said axle box, U bolts passing though said axle box ears and straddling the frame members and spring.

7. A car truck having a frame composed of a pair of spaced apart members, a leaf spring secured between said members, oppositely disposed U members for clamping the inner end of the spring between them, links connecting the car body and truck frame and a non-metallic washer interposed between each of said links and its connection.

Signed at the city and county of Philadelphia, State of Pennsylvania, this 27th day of March, 1919.

WALTER S. ADAMS.